United States Patent
Schlueter et al.

(10) Patent No.: US 12,541,844 B2
(45) Date of Patent: Feb. 3, 2026

(54) APPARATUS FOR SCAN DIRECTION AND STICHING SEQUENCE DETERMINATION OF A PLURALITY OF X-RAY IMAGES

(71) Applicant: KONINKLIJKE PHILIPS N.V., Eindhoven (NL)

(72) Inventors: Mathias Schlueter, Ahrensburg (DE); Edwin Jansen, Eindhoven (NL); Jeroen Van Brussel, Son en Breugel (NL); Flip Van Den Berg, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 358 days.

(21) Appl. No.: 18/033,441

(22) PCT Filed: Oct. 26, 2021

(86) PCT No.: PCT/EP2021/079625
§ 371 (c)(1),
(2) Date: Apr. 24, 2023

(87) PCT Pub. No.: WO2022/096313
PCT Pub. Date: May 12, 2022

(65) Prior Publication Data
US 2023/0410292 A1    Dec. 21, 2023

(30) Foreign Application Priority Data
Nov. 6, 2020   (EP) .................................. 20206186

(51) Int. Cl.
*G06K 9/00*  (2022.01)
*A61K 35/12*  (2015.01)
(Continued)

(52) U.S. Cl.
CPC .............. *G06T 7/0012* (2013.01); *G06T 3/60* (2013.01); *G06T 5/50* (2013.01); *G06V 10/16* (2022.01);
(Continued)

(58) Field of Classification Search
CPC .......... G06K 9/00; G06T 3/4038; A61B 6/542
(Continued)

(56) References Cited

U.S. PATENT DOCUMENTS 6,895,106 B2 *  5/2005  Wang .................... G01T 1/2014
                                                    382/284
7,650,044 B2 *  1/2010  Kreang-Arekul ......... G06T 5/94
                                                    382/128
(Continued)

FOREIGN PATENT DOCUMENTS

AU    2014277855 A1    7/2016
CN    103400363 A     11/2013
(Continued)

OTHER PUBLICATIONS

Improvement of automated image stitching system for DR X-ray images Fan Yang a Yan He a,n (Year: 2016).*
(Continued)

*Primary Examiner* — Seyed H Azarian

(57) ABSTRACT

The present invention relates to an apparatus (10) for scan direction detection and stitching sequence determination of a plurality of X-ray images, comprising: an input unit (20); a processing unit (30); and an output unit (40). The input unit is configured to provide the processing unit with a first X-ray image acquired by an X-ray image acquisition system, and the first image comprises image data of a patient. The input unit is configured to provide the processing unit with a second X-ray image acquired by the X-ray image acquisition (Continued)

system after it has moved with respect to the patient, and the second image comprises image data of the patient. The processing unit is configured to determine a top similarity value comprising a comparison of at least one region of image data of the patient at and/or adjacent to a top border in the first image with at least one equivalent sized region of image data of the patient at and/or adjacent to a bottom border in the second image. The processing unit is configured to determine a right similarity value comprising a comparison of at least one region of image data of the patient at and/or adjacent to a right border in the first image with at least one equivalent sized region of image data of the patient at and/or adjacent to a left border in the second image. The processing unit is configured to determine a bottom similarity value comprising a comparison of at least one region of image data of the patient at and/or adjacent to a bottom border in the first image with at least one equivalent sized region of image data of the patient at and/or adjacent to a top border in the second image. The processing unit is configured to determine a left similarity value comprising a comparison of at least one region of image data of the patient at and/or adjacent to a left border in the first image with at least one equivalent sized region of image data of the patient at and/or adjacent to a right border in the second image. The processing unit is configured to determine a scan direction and translation distance of the X-ray image acquisition system associated with the movement of the X-ray acquisition system comprising utilization of a maximum of the top, right, bottom or left similarity values and/or determine a combined image formed from the first image and the second image comprising utilization of the maximum of the top, right, bottom or left similarity values. The output unit is configured to output the scan direction and translation distance and/or the combined image.

17 Claims, 8 Drawing Sheets

(51) Int. Cl.
  *G06T 3/60* (2006.01)
  *G06T 5/50* (2006.01)
  *G06T 7/00* (2017.01)
  *G06V 10/10* (2022.01)
  *G06V 10/74* (2022.01)
(52) U.S. Cl.
  CPC .. *G06V 10/761* (2022.01); *G06T 2207/10116* (2013.01); *G06T 2207/20221* (2013.01)
(58) Field of Classification Search
  USPC ....... 382/100, 103, 107, 128–134, 156, 167, 382/171, 173, 181, 199, 219, 224, 254, 382/274, 276, 284–291, 305; 378/4, 21, 378/206, 46
  See application file for complete search history.

(56) References Cited

U.S. PATENT DOCUMENTS

| | | | | |
|---|---|---|---|---|
| 10,631,813 | B1* | 4/2020 | Huang | G06T 7/0012 |
| 2003/0048938 | A1* | 3/2003 | Wang | G01T 1/2014 |
| | | | | 382/132 |
| 2005/0213849 | A1* | 9/2005 | Kreang-Arekul | G06T 3/4038 |
| | | | | 382/284 |
| 2012/0039447 | A1* | 2/2012 | Lalena | A61B 6/542 |
| | | | | 378/206 |
| 2020/0345319 | A1* | 11/2020 | Lee | A61B 6/5241 |

FOREIGN PATENT DOCUMENTS

| | | |
|---|---|---|
| EP | 1408450 A2 | 4/2004 |
| EP | 1408450 A3 | 7/2009 |

OTHER PUBLICATIONS

Capek et al., "A Fully-Automatic Stitching of 2D Medical Data Sets", BIOSIGNAL 2002, extended abstract.
Seo et al., "Image Stitching Using Normalized Cross-Correlation and the Thresholding Method in Fluorescence Microscopy Image of Brain Tumor Cells", Journal of Korea Multimedia Society, vol. 20, No. 7, Jul. 2017, pp. 979-985.
Kim et al., "NCC-based Stitching Performance in MFP Framework", Korean Society of Imaging Informatics in Medicine, 2017, https://www.ksiim.org/, pp. 1-6.
International Search report and Written Opinion of PCT/EP2021/079625, dated Feb. 11, 2022.

\* cited by examiner

Partial Images

Scan Direction : left –> right, right border stitching

Composite Image

APPARATUS FOR SCAN DIRECTION AND STICHING SEQUENCE DETERMINATION OF A PLURALITY OF X-RAY IMAGES

FIELD OF THE INVENTION

The present invention relates to apparatuses for scan direction detection and stitching sequence determination of a plurality of X-ray images, systems for scan direction detection and stitching sequence determination of a plurality of X-ray images, methods for scan direction detection and stitching sequence determination of a plurality of X-ray images, as well as to a computer program element and a computer readable medium.

BACKGROUND OF THE INVENTION

During x-ray examination of the body part, the body part to be examined can exceed the x-ray detector area and a number of separate x-ray images can be acquired, where for example a C-arm of a mobile C-arm x-ray system can be moved. The images are then combined would has termed an image stitching process, and the sequences of images acquired can be termed a stitching sequence of x-ray images.

When acquiring such a stitching sequence of X-ray images, typically the device is moved along a straight direction along one X-ray detector axis from one acquisition position to the next position. Prior to the acquisition, the user selects this scan direction according to the clinical needs. If the movement is not motorized but a simple manual displacement, there is no information about the detectors position corresponding to the acquired partial images. There is then no information regarding which of the four partial image borders of subsequent partial images of the stitching sequence match to its predecessor.

Also, for such manual movement the movement may not have been exactly in a straight line and, the movement from one subsequent image the next could deviate from the previous direction, further complicating how to determine to stitch images together.

There is a need to address these issues.

SUMMARY OF THE INVENTION

It would be advantageous to have improved means of determining scan direction of an x-ray system acquiring a sequence of stitching images, and determining how those images should be stitched together. The object of the present invention is solved with the subject matter of the independent claims, wherein further embodiments are incorporated in the dependent claims. It should be noted that the following described aspects and examples of the invention apply also to the apparatuses for scan direction detection and stitching sequence determination of a plurality of X-ray images, systems for scan direction detection and stitching sequence determination of a plurality of X-ray images, and methods for scan direction detection and stitching sequence determination of a plurality of X-ray images, as well as to a computer program element and a computer readable medium.

In a first aspect, there is provided an apparatus for scan direction detection and stitching sequence determination of a plurality of X-ray images, comprising:

an input unit;
a processing unit; and
an output unit.

The input unit is configured to provide the processing unit with a first X-ray image acquired by an X-ray image acquisition system, and the first image comprises image data of a patient. The input unit is configured to provide the processing unit with a second X-ray image acquired by the X-ray image acquisition system after it has moved with respect to the patient, and the second image comprises image data of the patient. The processing unit is configured to determine a top similarity value comprising a comparison of at least one region of image data of the patient at and/or adjacent to a top border in the first image with at least one equivalent sized region of image data of the patient at and/or adjacent to a bottom border in the second image. The processing unit is configured to determine a right similarity value comprising a comparison of at least one region of image data of the patient at and/or adjacent to a right border in the first image with at least one equivalent sized region of image data of the patient at and/or adjacent to a left border in the second image. The processing unit is configured to determine a bottom similarity value comprising a comparison of at least one region of image data of the patient at and/or adjacent to a bottom border in the first image with at least one equivalent sized region of image data of the patient at and/or adjacent to a top border in the second image. The processing unit is configured to determine a left similarity value comprising a comparison of at least one region of image data of the patient at and/or adjacent to a left border in the first image with at least one equivalent sized region of image data of the patient at and/or adjacent to a right border in the second image. The processing unit is configured to determine a scan direction and translation distance of the X-ray image acquisition system associated with the movement of the X-ray acquisition system comprising utilization of a maximum of the top, right, bottom or left similarity values and/or determine a combined image formed from the first image and the second image comprising utilization of the maximum of the top, right, bottom or left similarity values. The output unit is configured to output the scan direction and translation distance and/or the combined image.

In other words, an x-ray acquisition system has acquired a first image and then moved and acquired a second image. However, it is not known in which direction the x-ray acquisition system is moved and indeed how far it has moved. Thus, to fit or match the two images together the second image may need to be positioned above the first image, to the right hand side of the first image, below the first image or to the left of the first image. And furthermore, it is not known if the second image should butt up against the first image, in other words the image acquisition system is moved exactly a field-of-view distance, all if the image acquisition system is moved less than field-of-view distance then how much should the 2 images overlay? The new apparatus addresses this situation. It does this by in effect overlaying the first image with the second image at the top border and determining a measure of similarity. This is then done with the second image at the right hand side of the first image, and then the second image below the first image, and then the second image to the left of the first image. The maximum similarity value of these different arrangements then provides the correct positioning of the second image with respect to the first image and provides the degree of overlay required. At the same time, this information also provides the determination of the direction in which the image acquisition system is moved and how far it moved between the 2 image acquisitions.

It is to be noted that "top" similarity value means similarity value calculated when the second image was positioned at the top of the first image, with "bottom" about the value meaning similarity value calculated when the second image was positioned at the bottom of the first image.

In an example, determination of the top similarity value comprises a determination of a plurality of similarity values comprising a comparison of an associated plurality of different sized regions of image data of the patient in the first image and the second image and a selection of a maximum similarity value of the plurality of similarity values as the top similarity value. Determination of the right similarity value comprises a determination of a plurality of similarity values comprising a comparison of an associated plurality of different sized regions of image data of the patient in the first image and the second image and a selection of a maximum similarity value of the plurality of similarity values as the right similarity value. Determination of the bottom similarity value comprises a determination of a plurality of similarity values comprising a comparison of an associated plurality of different sized regions of image data of the patient in the first image and the second image and a selection of a maximum similarity value of the plurality of similarity values as the bottom similarity value. Determination of the left similarity value comprises a determination of a plurality of similarity values comprising a comparison of an associated plurality of different sized regions of image data of the patient in the first image and the second image and a selection of a maximum similarity value of the plurality of similarity values as the left similarity value.

Thus, with respect to for example the positioning of the second image above the first image, a whole series of different similarity values are determined for different degrees of overlay of the second image with respect to the first image. This can relate to the second image almost butting up against the first image, with a small amount of overlay, and a similarity value been calculated and indeed calculated for the second image butting up against the first image but being moved laterally slightly, in other words the sides of the 2 images would then align to a minimal amount. Here, butting up means that there is at least some longitudinal overlay, but a minimal amount. The similarity value can also be calculated as the second image actually overlays areas of the first image, where again overlay translation into translation directions can be utilised. In each of these situations, a similarity value is calculated. Then, the maximum value provides the best overlay between the second image and the first image when the second image is above the first image. This process is then repeated for the second image to the right, below, and to the left of the first image. Then, the maximum similarity values of each of the 4 maximum similarity values for the top, right, bottom and left situations then provides the correct positioning of the second image with respect to the first image, for example with a second image should be below the first image with a certain degree of overlay.

In an example, the comparison of each region of image data of the patient at and/or adjacent to the top border in the first image with the equivalent sized region of image data of the patient at and/or adjacent to the bottom border in the second image comprises utilization of a top normalized cross correlation algorithm.

In an example, the comparison of each region of image data of the patient at and/or adjacent to the right border in the first image with the equivalent sized region of image data of the patient at and/or adjacent to the left border in the second image comprises utilization of a right normalized cross correlation algorithm. The comparison of each region of image data of the patient at and/or adjacent to the bottom border in the first image with the equivalent sized region of image data of the patient at and/or adjacent to the top border in the second image comprises utilization of the top normalized cross correlation algorithm or a bottom normalized cross correlation algorithm. The comparison of each region of image data of the patient at and/or adjacent to the left border in the first image with the equivalent sized region of image data of the patient at and/or adjacent to the right border in the second image comprises utilization of the right normalized cross correlation algorithm or a left normalized cross correlation algorithm.

It is to be noted that "top normalised cross correlation algorithm" means a normalised cross correlation algorithm utilised when the second image was positioned at the top of the first image, with "bottom normalised cross correlation algorithm" meaning a normalised cross correlation algorithm utilised in the second image was positioned at the bottom of the first image.

In an example, the comparison of each region of image data of the patient at and/or adjacent to the right border in the first image with the equivalent sized region of image data of the patient at and/or adjacent to the left border in the second image comprises utilization of the top normalized cross correlation algorithm. The comparison of each region of image data of the patient at and/or adjacent to the bottom border in the first image with the equivalent sized region of image data of the patient at and/or adjacent to the top border in the second image comprises utilization of the top normalized cross correlation algorithm. The comparison of each region of image data of the patient at and/or adjacent to the left border in the first image with the equivalent sized region of image data of the patient at and/or adjacent to the right border in the second image comprises utilization of the top normalized cross correlation algorithm.

In an example, the comparison of each region of image data of the patient at and/or adjacent to the right border in the first image with the equivalent sized region of image data of the patient at and/or adjacent to the left border in the second image comprises a counterclockwise 90 degree rotation of the first image and a counterclockwise 90 degree rotation of the second image prior to the utilization of the top normalized cross correlation algorithm. The comparison of each region of image data of the patient at and/or adjacent to the bottom border in the first image with the equivalent sized region of image data of the patient at and/or adjacent to the top border in the second image comprises a 180 degree rotation of the first image and a 180 degree rotation of the second image prior to the utilization of the top normalized cross correlation algorithm. The comparison of each region of image data of the patient at and/or adjacent to the left border in the first image with the equivalent sized region of image data of the patient at and/or adjacent to the right border in the second image comprises a clockwise 90 degree rotation of the first image and a clockwise 90 degree rotation of the second image prior to the utilization of the top normalized cross correlation algorithm.

In other words, when comparing the second image to the first image by free effect overlaying the second image over the first image with various degrees of overlay, a different algorithm can be utilised for the top, right, bottom and left situations where in effect for the top situation the second image can be moved downwards and slightly to the right and left with the downward movement if necessary. Then for example for the left situation the second image can be moved to the right and slightly up and down with the right movement if necessary. However, it has been found to be computationally effective to rotate both images in order that the same algorithm, for example the top algorithm, can be utilised in all situations.

In a second aspect, there is provided an apparatus for scan direction detection and stitching sequence determination of a plurality of X-ray images, comprising:

an input unit;
a processing unit; and
an output unit.

The input unit is configured to provide the processing unit with a plurality of "N" X-ray images acquired by an X-ray image acquisition system. After each of the first N−1 images the X-ray image acquisition moved with respect to a patient, and each of the N X-ray images comprises image data of the patient. An X-ray image of the N X-ray images is selected. This can be done by the processing unit or manually. The processing unit is configured to determine a top similarity value comprising a determination of a plurality of similarity values comprising a comparison of at least one region of image data of the patient at and/or adjacent to a top border in the selected image with at least one equivalent sized region of image data of the patient at and/or adjacent to a bottom border in each of the other N−1 images, and wherein the processing unit is configured to select a maximum similarity value of the plurality of similarity values as the top similarity value. The processing unit is configured to determine a right similarity value comprising a determination of a plurality of similarity values comprising a comparison of at least one region of image data of the patient at and/or adjacent to a right border in the selected image with at least one equivalent sized region of image data of the patient at and/or adjacent to a left border in each of the other N−1 images, and wherein the processing unit is configured to select a maximum similarity value of the plurality of similarity values as the right similarity value. The processing unit is configured to determine a bottom similarity value comprising a determination of a plurality of similarity values comprising a comparison of at least one region of image data of the patient at and/or adjacent to a bottom border in the selected image with at least one equivalent sized region of image data of the patient at and/or adjacent to a top border in each of the other N−1 images, and wherein the processing unit is configured to select a maximum similarity value of the plurality of similarity values as the bottom similarity value. The processing unit is configured to determine a left similarity value comprising a determination of a plurality of similarity values comprising a comparison of at least one region of image data of the patient at and/or adjacent to a left border in the selected image with at least one equivalent sized region of image data of the patient at and/or adjacent to a right border in each of the other N−1 images, and wherein the processing unit is configured to select a maximum similarity value of the plurality of similarity values as the left similarity value. The processing unit is configured to determine a scan direction and translation distance of the X-ray image acquisition system associated with the movement of the X-ray acquisition system comprising utilization of a maximum of the top, right, bottom or left similarity values and/or determine a combined image formed from the selected image and a second image comprising utilization of the maximum of the top, right, bottom or left similarity values. The output unit is configured to output the scan direction and translation distance and/or the combined image.

In other words, an x-ray acquisition system has acquired a number of images in between each image acquisition the x-ray acquisition system was moved. However, it is not known in which order the images were acquired and indeed in which direction or directions the x-ray acquisition system was moved. The new apparatus addresses this situation. Any one of the images is first selected, this can be by the processing unit or by human and can be completely random. Then, all the other images are each individually matched to the selected image to determine its best positioning with respect to the first image, either above to the right below to the left. Then of all the situations for the different images matched to the first image, the highest similarity value for a particular situation provides not only the correct second image matching to the first image, but provides also how that second image should match the first image and this information also provides the distance and direction the x-ray imaging system moved. The process can then be carried out for the first image again, where for example it may not have been the first image acquired and there may be an image that should be combined on the other side. Or, the process can be repeated for the image that has just been combined with the first image, to determine the next image that should be combined with this further image and the positioning and movement of the x-ray image acquisition system, which need not be in the same direction where for example a dogleg movement of the image acquisition system may have occurred. However, the new apparatus can stitch together all the images irrespective of how the x-ray image acquisition system has moved as long as the movement was not greater than a field of view of the image acquisition system and the movement was not reversed.

It is to be noted that to stitch together images as detailed above, no temporal information is required. However, a scan direction can be determined in the manner detailed above, but it cannot be determined if this was for example from the top to the bottom or from the bottom to the top. Thus here "scan direction" means for example top to bottom or bottom to top. However, with an acquisition time for the images, the images can be stitched together in the above manner, and an absolute scan direction can also be determined, thus it can be determined that the scan direction was bottom to top.

In an example, for each pair of the selected image and an image of the other N−1 images determination of the top similarity value comprises a determination of a plurality of similarity values comprising a comparison of an associated plurality of different sized regions of image data of the patient in the selected image and the image of the other N−1 images and a selection of a maximum similarity value of the plurality of similarity values as the top similarity value. For each pair of the selected image and an image of the other N−1 images determination of the right similarity value comprises a determination of a plurality of similarity values comprising a comparison of an associated plurality of different sized regions of image data of the patient in the selected image and the image of the other N−1 images and a selection of a maximum similarity value of the plurality of similarity values as the right similarity value. For each pair of the selected image and an image of the other N−1 images determination of the bottom similarity value comprises a determination of a plurality of similarity values comprising a comparison of an associated plurality of different sized regions of image data of the patient in the selected image and the image of the other N−1 images and a selection of a maximum similarity value of the plurality of similarity values as the bottom similarity value. For each pair of the selected image and an image of the other N−1 images determination of the left similarity value comprises a determination of a plurality of similarity values comprising a comparison of an associated plurality of different sized regions of image data of the patient in the selected image and the image of the other N−1 images and a selection of a maximum similarity value of the plurality of similarity values as the left similarity value.

In an example, the comparison of each region of image data of the patient at and/or adjacent to the top border in the selected image with the equivalent sized region of image data of the patient at and/or adjacent to the bottom border in each of the other N−1 images comprises utilization of a top normalized cross correlation algorithm.

In an example, the comparison of each region of image data of the patient at and/or adjacent to the right border in the selected image with the equivalent sized region of image data of the patient at and/or adjacent to the left border in each of the other N−1 images comprises utilization of a right normalized cross correlation algorithm. The comparison of each region of image data of the patient at and/or adjacent to the bottom border in the selected image with the equivalent sized region of image data of the patient at and/or adjacent to the top border in each of the other N−1 images comprises utilization of a bottom normalized cross correlation algorithm. The comparison of each region of image data of the patient at and/or adjacent to the left border in the selected image with the equivalent sized region of image data of the patient at and/or adjacent to the right border in each of the other N−1 images comprises utilization of a left normalized cross correlation algorithm.

In an example, the comparison of each region of image data of the patient at and/or adjacent to the right border in the selected image with the equivalent sized region of image data of the patient at and/or adjacent to the left border in each of the other N−1 images comprises utilization of the top normalized cross correlation algorithm. The comparison of each region of image data of the patient at and/or adjacent to the bottom border in the selected image with the equivalent sized region of image data of the patient at and/or adjacent to the top border in each of the other N−1 images comprises utilization of the top normalized cross correlation algorithm. The comparison of each region of image data of the patient at and/or adjacent to the left border in the selected image with the equivalent sized region of image data of the patient at and/or adjacent to the right border in each of the other N−1 images comprises utilization of the top normalized cross correlation algorithm.

In an example, the comparison of each region of image data of the patient at and/or adjacent to the right border in the selected image with the equivalent sized region of image data of the patient at and/or adjacent to the left border in the each of the other N−1 images comprises a counterclockwise 90 degree rotation of the selected image and a counterclockwise 90 degree rotation of each of the other N−1 images prior to the utilization of the top normalized cross correlation algorithm. The comparison of each region of image data of the patient at and/or adjacent to the bottom border in the selected image with the equivalent sized region of image data of the patient at and/or adjacent to the top border in the each of the other N−1 images comprises a 180 degree rotation of the selected image and a 180 degree rotation of each of the other N−1 images prior to the utilization of the top normalized cross correlation algorithm. The comparison of each region of image data of the patient at and/or adjacent to the left border in the selected image with the equivalent sized region of image data of the patient at and/or adjacent to the right border in the each of the other N−1 images comprises a clockwise 90 degree rotation of the selected image and a clockwise 90 degree rotation of each of the other N−1 images prior to the utilization of the top normalized cross correlation algorithm.

In a third aspect, there is provided a system for scan direction detection and stitching sequence determination of a plurality of X-ray images, comprising:
  an image acquisition system;
  an apparatus according to the first aspect, and/or
  an apparatus according to the second aspect.

In a fourth aspect, there is provided a method for scan direction detection and stitching sequence determination of a plurality of X-ray images, comprising:
  a) providing a processing unit with a first X-ray image acquired by an X-ray image acquisition system, and wherein the first image comprises image data of a patient;
  b) providing the processing unit with a second X-ray image acquired by the X-ray image acquisition system after it has moved with respect to the patient, and wherein the second image comprises image data of the patient;
  c) determining by the processing unit a top similarity value comprising comparing at least one region of image data of the patient at and/or adjacent to a top border in the first image with at least one equivalent sized region of image data of the patient at and/or adjacent to a bottom border in the second image;
  d) determining by the processing unit a right similarity value comprising comparison at least one region of image data of the patient at and/or adjacent to a right border in the first image with at least one equivalent sized region of image data of the patient at and/or adjacent to a left border in the second image;
  e) determining by the processing unit a bottom similarity value comprising comparing at least one region of image data of the patient at and/or adjacent to a bottom border in the first image with at least one equivalent sized region of image data of the patient at and/or adjacent to a top border in the second image;
  f) determining by the processing unit a left similarity value comprising comparison at least one region of image data of the patient at and/or adjacent to a left border in the first image with at least one equivalent sized region of image data of the patient at and/or adjacent to a right border in the second image;
  g) determining by the processing unit a scan direction and translation distance of the X-ray image acquisition system associated with the movement of the X-ray acquisition system comprising utilizing a maximum of the top, right, bottom or left similarity values and/or determining a combined image formed from the first image and the second image comprising utilizing the maximum of the top, right, bottom or left similarity values; and
  h) outputting by an output unit the scan direction and translation distance and/or the combined image.

In a fifth aspect, there is provided a method for scan direction detection and stitching sequence determination of a plurality of X-ray images, comprising:
  a1) providing a processing unit with a plurality "N" X-ray images acquired by an X-ray image acquisition system, wherein after each of the first N−1 images the X-ray image acquisition moved with respect to a patient, and wherein each of the N X-ray images comprises image data of the patient;
  b1) selecting an X-ray image of the N X-ray images;
  c1) determining by the processing unit a top similarity value comprising determining a plurality of similarity values comprising comparing at least one region of image data of the patient at and/or adjacent to a top border in the selected image with at least one equivalent sized region of image data of the patient at and/or adjacent to a bottom border in each of the other N−1 images, and selecting by the processing unit a maximum similarity value of the plurality of similarity values as the top similarity value;

d1) determining by the processing unit a right similarity value comprising determining a plurality of similarity values comprising comparing at least one region of image data of the patient at and/or adjacent to a right border in the selected image with at least one equivalent sized region of image data of the patient at and/or adjacent to a left border in each of the other N−1 images, and selecting by the processing unit a maximum similarity value of the plurality of similarity values as the right similarity value;

e1) determining by the processing unit a bottom similarity value comprising determining a plurality of similarity values comprising comparing at least one region of image data of the patient at and/or adjacent to a bottom border in the selected image with at least one equivalent sized region of image data of the patient at and/or adjacent to a top border in each of the other N−1 images, and selecting by the processing unit a maximum similarity value of the plurality of similarity values as the bottom similarity value;

f1) determining by the processing unit a left similarity value comprising determining a plurality of similarity values comprising comparing at least one region of image data of the patient at and/or adjacent to a left border in the selected image with at least one equivalent sized region of image data of the patient at and/or adjacent to a right border in each of the other N−1 images, and selecting by the processing unit a maximum similarity value of the plurality of similarity values as the left similarity value;

g1) determining by the processing unit a scan direction and translation distance of the X-ray image acquisition system associated with the movement of the X-ray acquisition system comprising utilizing a maximum of the top, right, bottom or left similarity values and/or determining a combined image formed from the selected image and a second image comprising utilizing the maximum of the top, right, bottom or left similarity values; and h1) outputting by an output unit the scan direction and translation distance and/or the combined image.

According to another aspect, there is provided a computer program element controlling one or more of the apparatuses or systems as previously described which, if the computer program element is executed by a processing unit, is adapted to perform one or more of the methods as previously described.

According to another aspect, there is provided a computer readable medium having stored computer element as previously described.

The computer program element can for example be a software program but can also be a FPGA, a PLD or any other appropriate digital means.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawing.

DETAILED DESCRIPTION OF EMBODIMENTS

Figure 1:
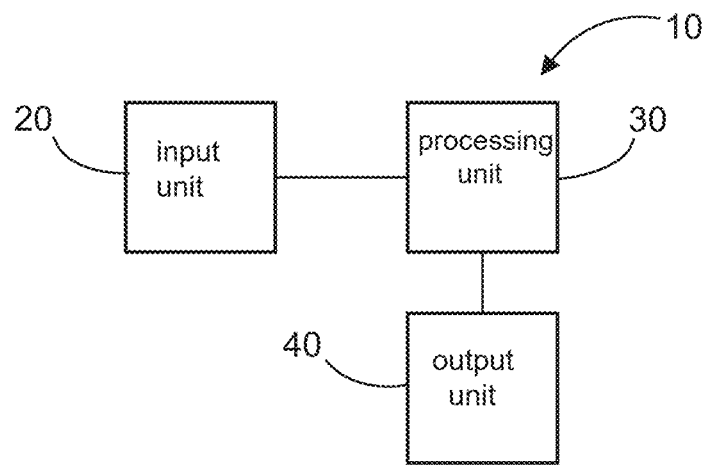
FIG. 1 shows a schematic set up of an example of an apparatus for scan direction detection and stitching sequence determination of two X-ray images.

FIG. 1 shows a schematic example of an apparatus 10 for scan direction detection and stitching sequence determination of two X-ray images. The apparatus comprises an input unit 20, a processing unit 30, and an output unit 40. The input unit is configured to provide the processing unit with a first X-ray image acquired by an X-ray image acquisition system, and wherein the first image comprises image data of a patient. The input unit is configured to provide the processing unit with a second X-ray image acquired by the X-ray image acquisition system after it has moved with respect to the patient, and wherein the second image comprises image data of the patient. The processing unit is configured to determine a top similarity value comprising a comparison of at least one region of image data of the patient at and/or adjacent to a top border in the first image with at least one equivalent sized region of image data of the patient at and/or adjacent to a bottom border in the second image. The processing unit is configured to determine a right similarity value comprising a comparison of at least one region of image data of the patient at and/or adjacent to a right border in the first image with at least one equivalent sized region of image data of the patient at and/or adjacent to a left border in the second image. The processing unit is configured to determine a bottom similarity value comprising a comparison of at least one region of image data of the patient at and/or adjacent to a bottom border in the first image with at least one equivalent sized region of image data of the patient at and/or adjacent to a top border in the second image. The processing unit is configured to determine a left similarity value comprising a comparison of at least one region of image data of the patient at and/or adjacent to a left border in the first image with at least one equivalent sized region of image data of the patient at and/or adjacent to a right border in the second image. The processing unit is configured to determine a scan direction and translation distance of the X-ray image acquisition system associated with the movement of the X-ray acquisition system comprising utilization of a maximum of the top, right, bottom or left similarity values and/or determine a combined image formed from the first image and the second image comprising utilization of the maximum of the top, right, bottom or left similarity values. The output unit is configured to output the scan direction and translation distance and/or the combined image.

According to an example, determination of the top similarity value comprises a determination of a plurality of similarity values comprising a comparison of an associated plurality of different sized regions of image data of the patient in the first image and the second image and a selection of a maximum similarity value of the plurality of similarity values as the top similarity value. Determination of the right similarity value comprises a determination of a plurality of similarity values comprising a comparison of an associated plurality of different sized regions of image data of the patient in the first image and the second image and a selection of a maximum similarity value of the plurality of similarity values as the right similarity value. Determination of the bottom similarity value comprises a determination of a plurality of similarity values comprising a comparison of an associated plurality of different sized regions of image data of the patient in the first image and the second image and a selection of a maximum similarity value of the plurality of similarity values as the bottom similarity value. Determination of the left similarity value comprises a determination of a plurality of similarity values comprising a comparison of an associated plurality of different sized regions of image data of the patient in the first image and the second image and a selection of a maximum similarity value of the plurality of similarity values as the left similarity value.

According to an example, the comparison of each region of image data of the patient at and/or adjacent to the top border in the first image with the equivalent sized region of image data of the patient at and/or adjacent to the bottom border in the second image comprises utilization of a top normalized cross correlation algorithm.

According to an example, the comparison of each region of image data of the patient at and/or adjacent to the right border in the first image with the equivalent sized region of image data of the patient at and/or adjacent to the left border in the second image comprises utilization of a right normalized cross correlation algorithm. The comparison of each region of image data of the patient at and/or adjacent to the bottom border in the first image with the equivalent sized region of image data of the patient at and/or adjacent to the top border in the second image comprises utilization of the top normalized cross correlation algorithm or a bottom normalized cross correlation algorithm. The comparison of each region of image data of the patient at and/or adjacent to the left border in the first image with the equivalent sized region of image data of the patient at and/or adjacent to the right border in the second image comprises utilization of the right normalized cross correlation algorithm or a left normalized cross correlation algorithm.

According to an example, the comparison of each region of image data of the patient at and/or adjacent to the right border in the first image with the equivalent sized region of image data of the patient at and/or adjacent to the left border in the second image comprises utilization of the top normalized cross correlation algorithm. The comparison of each region of image data of the patient at and/or adjacent to the bottom border in the first image with the equivalent sized region of image data of the patient at and/or adjacent to the top border in the second image comprises utilization of the top normalized cross correlation algorithm. The comparison of each region of image data of the patient at and/or adjacent to the left border in the first image with the equivalent sized region of image data of the patient at and/or adjacent to the right border in the second image comprises utilization of the top normalized cross correlation algorithm.

According to an example, the comparison of each region of image data of the patient at and/or adjacent to the right border in the first image with the equivalent sized region of image data of the patient at and/or adjacent to the left border in the second image comprises a counterclockwise 90 degree rotation of the first image and a counterclockwise 90 degree rotation of the second image prior to the utilization of the top normalized cross correlation algorithm. The comparison of each region of image data of the patient at and/or adjacent to the bottom border in the first image with the equivalent sized region of image data of the patient at and/or adjacent to the top border in the second image comprises a 180 degree rotation of the first image and a 180 degree rotation of the second image prior to the utilization of the top normalized cross correlation algorithm. The comparison of each region of image data of the patient at and/or adjacent to the left border in the first image with the equivalent sized region of image data of the patient at and/or adjacent to the right border in the second image comprises a clockwise 90 degree rotation of the first image and a clockwise 90 degree rotation of the second image prior to the utilization of the top normalized cross correlation algorithm.

Figure 2:
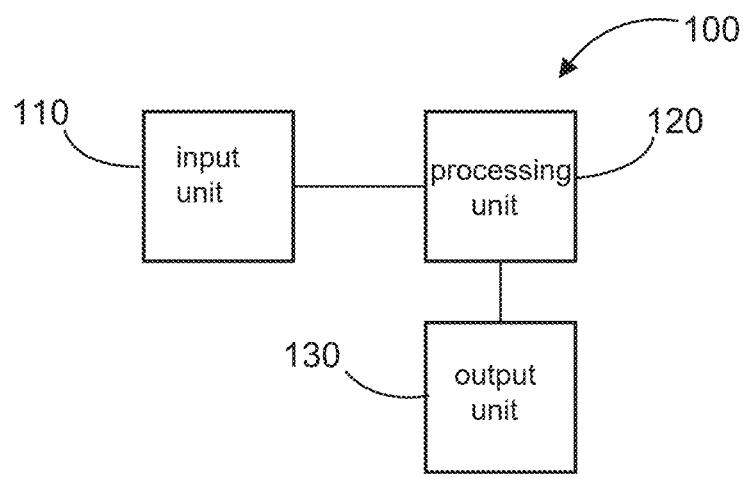
FIG. 2 shows a schematic set up of an example of an apparatus for scan direction detection and stitching sequence determination of a plurality of X-ray images.

FIG. 2 shows a schematic example of an apparatus 100 for scan direction detection and stitching sequence determination of a plurality of X-ray images. The apparatus comprises an input unit 110, a processing unit 120, and an output unit 130. The input unit is configured to provide the processing unit with a plurality "N" X-ray images acquired by an X-ray image acquisition system, wherein after each of the first N−1 images the X-ray image acquisition moved with respect to a patient, and wherein each of the N X-ray images comprises image data of the patient. An X-ray image of the N X-ray images is selected. The processing unit is configured to determine a top similarity value comprising a determination of a plurality of similarity values comprising a comparison of at least one region of image data of the patient at and/or adjacent to a top border in the selected image with at least one equivalent sized region of image data of the patient at and/or adjacent to a bottom border in each of the other N−1 images, and the processing unit is configured to select a maximum similarity value of the plurality of similarity values as the top similarity value. The processing unit is configured to determine a right similarity value comprising a determination of a plurality of similarity values comprising a comparison of at least one region of image data of the patient at and/or adjacent to a right border in the selected image with at least one equivalent sized region of image data of the patient at and/or adjacent to a left border in each of the other N−1 images, and the processing unit is configured to select a maximum similarity value of the plurality of similarity values as the right similarity value. The processing unit is configured to determine a bottom similarity value comprising a determination of a plurality of similarity values comprising a comparison of at least one region of image data of the patient at and/or adjacent to a bottom border in the selected image with at least one equivalent sized region of image data of the patient at and/or adjacent to a top border in each of the other N−1 images, and the processing unit is configured to select a maximum similarity value of the plurality of similarity values as the bottom similarity value. The processing unit is configured to determine a left similarity value comprising a determination of a plurality of similarity values comprising a comparison of at least one region of image data of the patient at and/or adjacent to a left border in the selected image with at least one equivalent sized region of image data of the patient at and/or adjacent to a right border in each of the other N−1 images, and the processing unit is configured to select a maximum similarity value of the plurality of similarity values as the left similarity value. The processing unit is configured to determine a scan direction and translation distance of the X-ray image acquisition system associated with the movement of the X-ray acquisition system comprising utilization of a maximum of the top, right, bottom or left similarity values and/or determine a combined image formed from the selected image and a second image comprising utilization of the maximum of the top, right, bottom or left similarity values. The output unit is configured to output the scan direction and translation distance and/or the combined image.

According to an example, for each pair of the selected image and an image of the other N−1 images determination of the top similarity value comprises a determination of a plurality of similarity values comprising a comparison of an associated plurality of different sized regions of image data of the patient in the selected image and the image of the other N−1 images and a selection of a maximum similarity value of the plurality of similarity values as the top similarity value. For each pair of the selected image and an image of the other N−1 images determination of the right similarity value comprises a determination of a plurality of similarity values comprising a comparison of an associated plurality of different sized regions of image data of the patient in the selected image and the image of the other N−1 images and a selection of a maximum similarity value of the plurality of similarity values as the top similarity value. For each pair of the selected image and an image of the other N−1 images determination of the bottom similarity value comprises a determination of a plurality of similarity values comprising a comparison of an associated plurality of different sized regions of image data of the patient in the selected image and the image of the other N−1 images and a selection of a maximum similarity value of the plurality of similarity values as the bottom similarity value. For each pair of the selected image and an image of the other N−1 images determination of the left similarity value comprises a determination of a plurality of similarity values comprising a comparison of an associated plurality of different sized regions of image data of the patient in the selected image and the image of the other N−1 images and a selection of a maximum similarity value of the plurality of similarity values as the left similarity value.

According to an example, the comparison of each region of image data of the patient at and/or adjacent to the top border in the selected image with the equivalent sized region of image data of the patient at and/or adjacent to the bottom border in each of the other N−1 images comprises utilization of a top normalized cross correlation algorithm.

According to an example, the comparison of each region of image data of the patient at and/or adjacent to the right border in the selected image with the equivalent sized region of image data of the patient at and/or adjacent to the left border in each of the other N−1 images comprises utilization of a right normalized cross correlation algorithm. The comparison of each region of image data of the patient at and/or adjacent to the bottom border in the selected image with the equivalent sized region of image data of the patient at and/or adjacent to the top border in each of the other N−1 images comprises utilization of a bottom normalized cross correlation algorithm. The comparison of each region of image data of the patient at and/or adjacent to the left border in the selected image with the equivalent sized region of image data of the patient at and/or adjacent to the right border in each of the other N−1 images comprises utilization of a left normalized cross correlation algorithm.

According to an example, the comparison of each region of image data of the patient at and/or adjacent to the right border in the selected image with the equivalent sized region of image data of the patient at and/or adjacent to the left border in each of the other N−1 images comprises utilization of the top normalized cross correlation algorithm. The comparison of each region of image data of the patient at and/or adjacent to the bottom border in the selected image with the equivalent sized region of image data of the patient at and/or adjacent to the top border in each of the other N−1 images comprises utilization of the top normalized cross correlation algorithm. The comparison of each region of image data of the patient at and/or adjacent to the left border in the selected image with the equivalent sized region of image data of the patient at and/or adjacent to the right border in each of the other N−1 images comprises utilization of the top normalized cross correlation algorithm.

According to an example, the comparison of each region of image data of the patient at and/or adjacent to the right border in the selected image with the equivalent sized region of image data of the patient at and/or adjacent to the left border in the each of the other N−1 images comprises a counterclockwise 90 degree rotation of the selected image and a counterclockwise 90 degree rotation of each of the other N−1 images prior to the utilization of the top normalized cross correlation algorithm. The comparison of each region of image data of the patient at and/or adjacent to the bottom border in the selected image with the equivalent sized region of image data of the patient at and/or adjacent to the top border in the each of the other N−1 images comprises a 180 degree rotation of the selected image and a 180 degree rotation of each of the other N−1 images prior to the utilization of the top normalized cross correlation algorithm. The comparison of each region of image data of the patient at and/or adjacent to the left border in the selected image with the equivalent sized region of image data of the patient at and/or adjacent to the right border in the each of the other N−1 images comprises a clockwise 90 degree rotation of the selected image and a clockwise 90 degree rotation of each of the other N−1 images prior to the utilization of the top normalized cross correlation algorithm.

Figure 3:
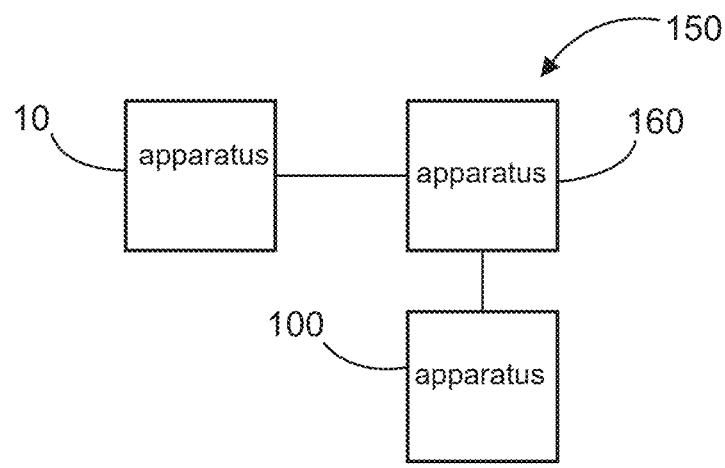
FIG. 3 shows a schematic set up of an example of a system for scan direction detection and stitching sequence determination of a plurality of X-ray images.

FIG. 3 shows a schematic example of a system 200 for scan direction detection and stitching sequence determination of a plurality of X-ray images. The system comprises an image acquisition system 150, an apparatus 10 as described with respect to FIG. 1, and/or an apparatus 100 as described with respect to FIG. 2.

Figure 4:
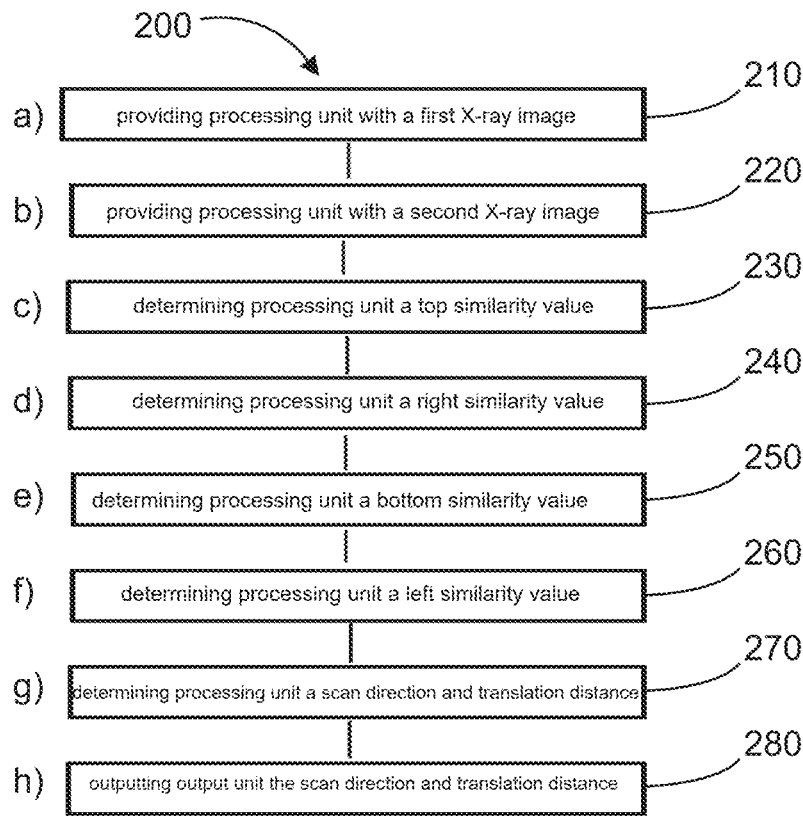
FIG. 4 shows a method for scan direction detection and stitching sequence determination of two X-ray images.

FIG. 4 shows a method 200 for scan direction detection and stitching sequence determination of two X-ray images, comprising:

- in a providing step 210, also referred to as step a), providing a processing unit with a first X-ray image acquired by an X-ray image acquisition system, and wherein the first image comprises image data of a patient;
- in a providing step 220, also referred to as step b), providing the processing unit with a second X-ray image acquired by the X-ray image acquisition system after it has moved with respect to the patient, and wherein the second image comprises image data of the patient;
- in a determining step 230, also referred to as step c), determining by the processing unit a top similarity value comprising comparing at least one region of image data of the patient at and/or adjacent to a top border in the first image with at least one equivalent sized region of image data of the patient at and/or adjacent to a bottom border in the second image;
- in a determining step 240, also referred to as step d), determining by the processing unit a right similarity value comprising comparison at least one region of image data of the patient at and/or adjacent to a right border in the first image with at least one equivalent sized region of image data of the patient at and/or adjacent to a left border in the second image;
- in a determining step 250, also referred to as step e), determining by the processing unit a bottom similarity value comprising comparing at least one region of image data of the patient at and/or adjacent to a bottom border in the first image with at least one equivalent sized region of image data of the patient at and/or adjacent to a top border in the second image;
- in a determining step 260, also referred to as step f), determining by the processing unit a left similarity value comprising comparison at least one region of image data of the patient at and/or adjacent to a left border in the first image with at least one equivalent sized region of image data of the patient at and/or adjacent to a right border in the second image;
- in a determining step 270, also referred to as step g), determining by the processing unit a scan direction and translation distance of the X-ray image acquisition system associated with the movement of the X-ray acquisition system comprising utilizing a maximum of the top, right, bottom or left similarity values and/or determining a combined image formed from the first image and the second image comprising utilizing the maximum of the top, right, bottom or left similarity values; and
- in a determining step 280, also referred to as step h), outputting by an output unit the scan direction and translation distance and/or the combined image.

In an example, step c) comprises determining a plurality of similarity values comprising comparing an associated plurality of different sized regions of image data of the patient in the first image and the second image and selecting a maximum similarity value of the plurality of similarity values as the top similarity value.

In an example, step d) comprises determination a plurality of similarity values comprising comparing an associated plurality of different sized regions of image data of the patient in the first image and the second image and selecting a maximum similarity value of the plurality of similarity values as the right similarity value.

In an example, step e) comprises determination a plurality of similarity values comprising comparing an associated plurality of different sized regions of image data of the patient in the first image and the second image and selecting a maximum similarity value of the plurality of similarity values as the bottom similarity value.

In an example, step f) comprises determination a plurality of similarity values comprising comparing an associated plurality of different sized regions of image data of the patient in the first image and the second image and selecting a maximum similarity value of the plurality of similarity values as the left similarity value.

In an example, step c) comprises utilizing a top normalized cross correlation algorithm.

In an example, step d) comprises utilizing a right normalized cross correlation algorithm.

In an example, step e) comprises utilizing a bottom normalized cross correlation algorithm.

In an example, step f) comprises utilizing a left normalized cross correlation algorithm.

In an example, step d) comprises utilizing the top normalized cross correlation algorithm.

In an example, step e) comprises utilizing the top normalized cross correlation algorithm.

In an example, step f) comprises utilizing the top normalized cross correlation algorithm.

In an example, step d) comprises rotating the first image counter-clockwise by 90 degrees and rotating the second image counter-clockwise by 90 degrees prior to utilizing the top normalized cross correlation algorithm.

In an example, step e) comprises rotating the first image by 180 degrees and rotating the second image by 180 degrees prior to utilizing the top normalized cross correlation algorithm.

In an example, step f) comprises rotating the first image clockwise by 90 degrees and rotating the second image clockwise by 90 degrees prior to utilizing the top normalized cross correlation algorithm.

Figure 5:
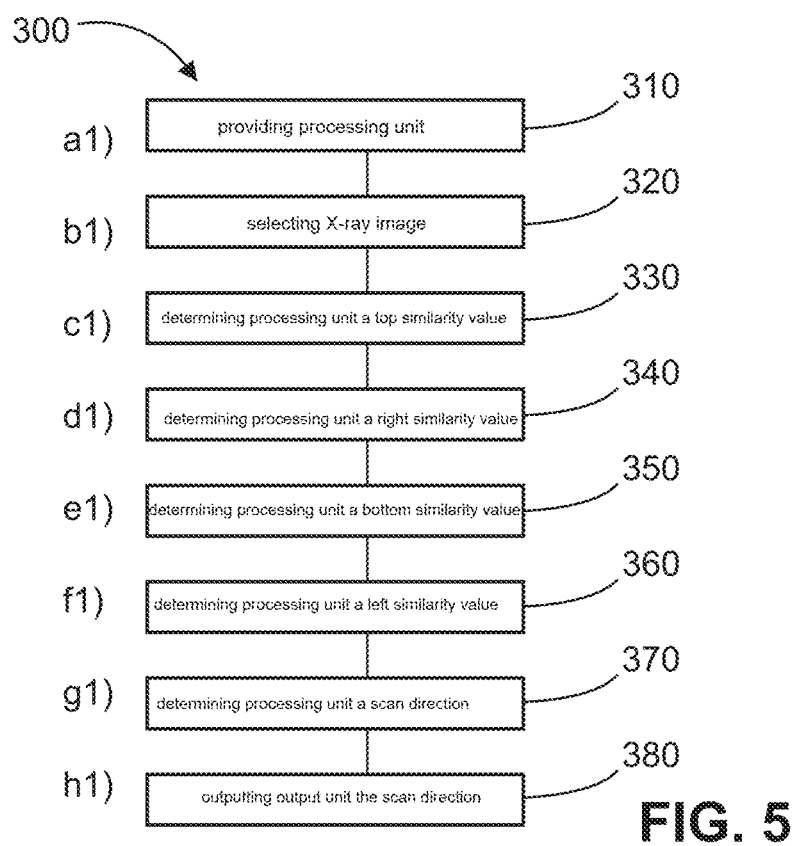
FIG. 5 shows a method for scan direction detection and stitching sequence determination of a plurality of X-ray images.

FIG. 5 shows a method 300 for scan direction detection and stitching sequence determination of a plurality of X-ray images, comprising:

- in a providing step 310, also referred to as step a1), providing a processing unit with a plurality "N" X-ray images acquired by an X-ray image acquisition system, wherein after each of the first N−1 images the X-ray image acquisition moved with respect to a patient, and wherein each of the N X-ray images comprises image data of the patient;
- in a selecting step 320, also referred to as step b1), selecting an X-ray image of the N X-ray images;
- in a determining step 330, also referred to as step c1), determining by the processing unit a top similarity value comprising determining a plurality of similarity values comprising comparing at least one region of image data of the patient at and/or adjacent to a top border in the selected image with at least one equivalent sized region of image data of the patient at and/or adjacent to a bottom border in each of the other N−1 images, and selecting by the processing unit a maximum similarity value of the plurality of similarity values as the top similarity value;

in a determining step 340, also referred to as step d1), determining by the processing unit a right similarity value comprising determining a plurality of similarity values comprising comparing at least one region of image data of the patient at and/or adjacent to a right border in the selected image with at least one equivalent sized region of image data of the patient at and/or adjacent to a left border in each of the other N−1 images, and selecting by the processing unit a maximum similarity value of the plurality of similarity values as the right similarity value;

in a determining step 350, also referred to as step e1), determining by the processing unit a bottom similarity value comprising determining a plurality of similarity values comprising comparing at least one region of image data of the patient at and/or adjacent to a bottom border in the selected image with at least one equivalent sized region of image data of the patient at and/or adjacent to a top border in each of the other N−1 images, and selecting by the processing unit a maximum similarity value of the plurality of similarity values as the bottom similarity value;

in a determining step 360, also referred to as step f1), determining by the processing unit a left similarity value comprising determining a plurality of similarity values comprising comparing at least one region of image data of the patient at and/or adjacent to a left border in the selected image with at least one equivalent sized region of image data of the patient at and/or adjacent to a right border in each of the other N−1 images, and selecting by the processing unit a maximum similarity value of the plurality of similarity values as the left similarity value;

in a determining step 370, also referred to as step g1), determining by the processing unit a scan direction and translation distance of the X-ray image acquisition system associated with the movement of the X-ray acquisition system comprising utilizing a maximum of the top, right, bottom or left similarity values and/or determining a combined image formed from the selected image and a second image comprising utilizing the maximum of the top, right, bottom or left similarity values; and in an outputting step 380, also referred to as step h1), outputting by an output unit the scan direction and translation distance and/or the combined image.

In an example, in step c1) for each pair of the selected image and an image of the other N−1 images, determining the top similarity value comprises determining a plurality of similarity values comprising comparing an associated plurality of different sized regions of image data of the patient in the selected image and the image of the other N−1 images and selecting a maximum similarity value of the plurality of similarity values as the top similarity value.

In an example, in step d1) for each pair of the selected image and an image of the other N−1 images, determining the right similarity value comprises determining a plurality of similarity values comprising comparing an associated plurality of different sized regions of image data of the patient in the selected image and the image of the other N−1 images and selecting a maximum similarity value of the plurality of similarity values as the right similarity value.

In an example, in step e1) for each pair of the selected image and an image of the other N−1 images, determining the bottom similarity value comprises determining a plurality of similarity values comprising comparing an associated plurality of different sized regions of image data of the patient in the selected image and the image of the other N−1 images and selecting a maximum similarity value of the plurality of similarity values as the bottom similarity value.

In an example, in step f1) for each pair of the selected image and an image of the other N−1 images, determining the left similarity value comprises determining a plurality of similarity values comprising comparing an associated plurality of different sized regions of image data of the patient in the selected image and the image of the other N−1 images and selecting a maximum similarity value of the plurality of similarity values as the left similarity value.

In an example, step c1) comprises utilizing a top normalized cross correlation algorithm.

In an example, step d1) comprises utilizing a right normalized cross correlation algorithm.

In an example, step e1) comprises utilizing a bottom normalized cross correlation algorithm.

In an example, step f1) comprises utilizing a left normalized cross correlation algorithm.

In an example, step d1) comprises utilizing the top normalized cross correlation algorithm.

In an example, step e1) comprises utilizing the top normalized cross correlation algorithm.

In an example, step f1) comprises utilizing the top normalized cross correlation algorithm.

In an example, step d1) comprises rotating the selected image counter-clockwise by 90 degrees and rotating each of the other N−1 images counter-clockwise by 90 degrees prior to the utilizing of the top normalized cross correlation algorithm.

In an example, step e1) comprises rotating the selected image by 180 degrees and rotating each of the other N−1 images by 180 degrees prior to the utilizing the top normalized cross correlation algorithm.

In an example, step f1) comprises rotating the selected image clockwise by 90 degrees and rotating each of the other N−1 images clockwise by 90 degrees prior to the utilizing of the top normalized cross correlation algorithm.

Thus, a new technique is provided for the automatic detection of one of the four partial image borders at which partial images are stitched together. This is equivalent to the detection of one of the following 4 scan directions:

| left to right | ⇔ | right border stitching |
| right to left | ⇔ | left border stitching |
| top to bottom | ⇔ | bottom border stitching |
| border stitching | ⇔ | top bottom to top |

The apparatuses, system and method for scan direction detection and stitching sequence determination of a plurality of X-ray images are now described in specific further detail, where reference is made to FIGS. 6-11.

As discussed above, for some mobile c-arm X-ray systems, the c-arm is moved manually and there is no information about the detector's position corresponding to the acquired partial images. As a consequence, the system has no information at which of the 4 image borders partial images have to be stitched together and the user has to specify the scan direction. This means, the user either has to have knowledge about the system geometry and acquisition context or he has to detect the scan direction visually from the image content of the partial images, which is inconvenient and error-prone.

Figure 6:
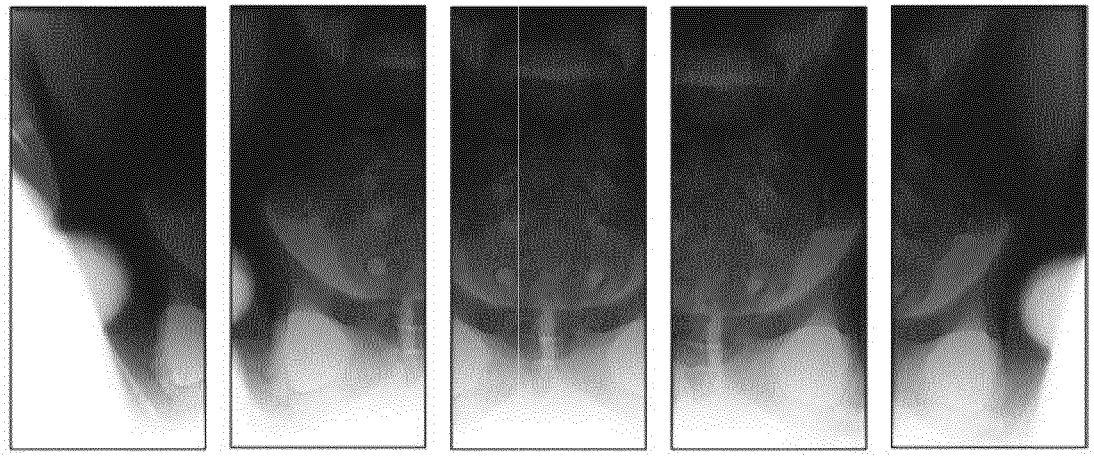
FIG. 6 shows an example of hip stitching, showing 5 partial images acquired in a left-to-right scan direction and showing a composite image following right border stitching.
Figure 6:
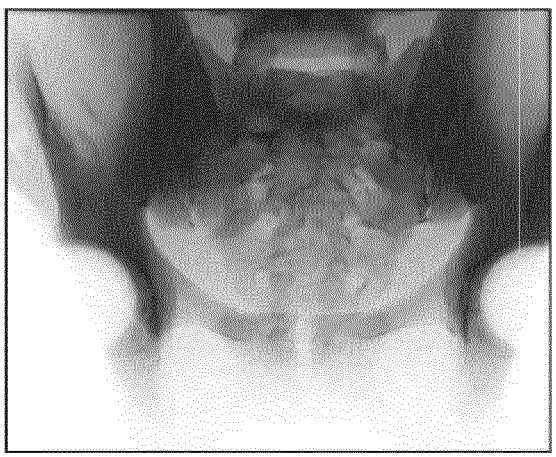
Figure 7:
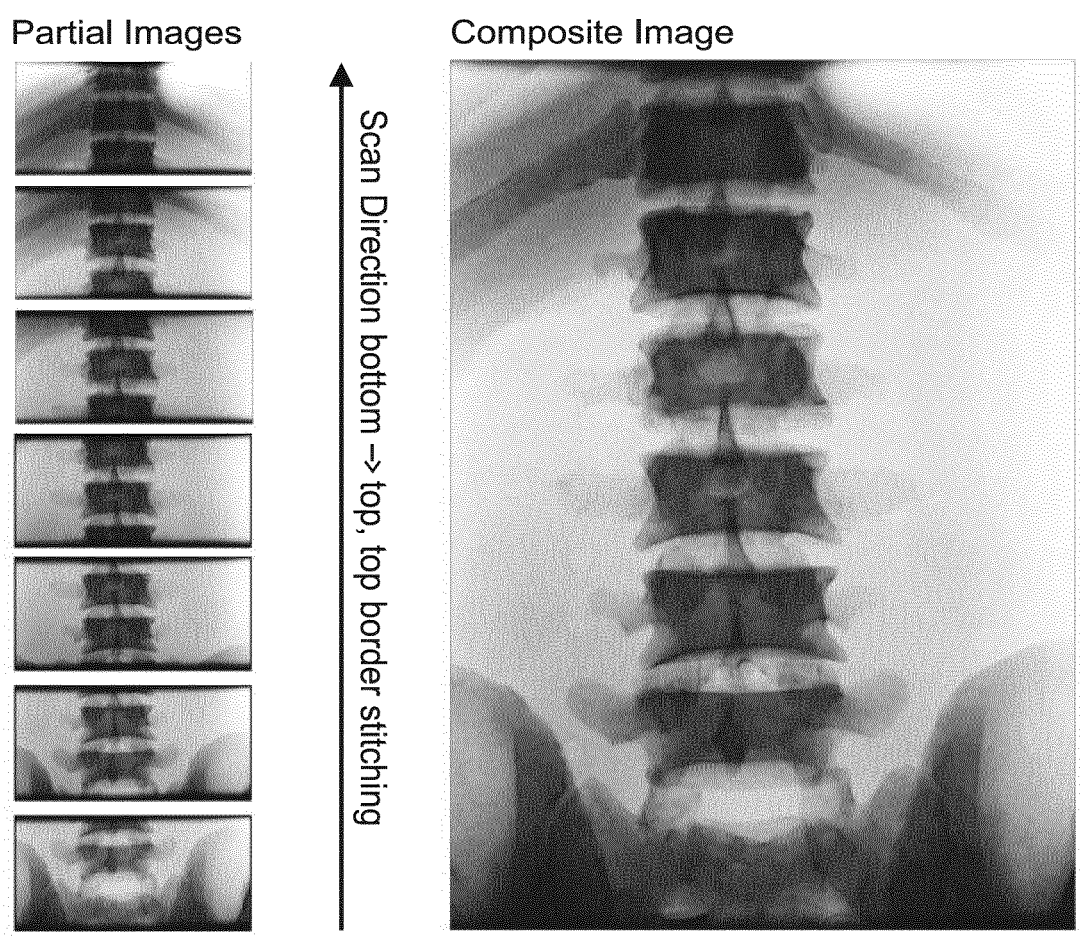
FIG. 7 shows an example of spine stitching, showing 7 partial images acquired in a bottom to top scan direction, and showing a composite image following top border image stitching.

However, the apparatuses, systems and method described here address this. FIG. 6 and FIG. 7 illustrate the situation for two different scan directions and anatomies, where an image sequence has been stitched together. This is achieved via automatically detecting the image border where the partial images are stitched together without any external inputs provided to the stitching algorithm. This is then equivalent to the automatic detection of the scan direction.

In order to automatically select the correct stitching border, the following procedure is carried out. Without loss of generality it is assumed that two temporal subsequent images out of the stitching sequence have been chosen. Otherwise, the resulting maximal similarity would be smaller than the similarity for the two subsequent images considered here:

Match a partial image to all 4 borders of its predecessor and measure the similarity as the Normalized Cross Correlation (NCC, see below).

Let $b^{1,2} \in$ {left, right, top, bottom} be the border corresponding to first and second highest similarity, respectively. Here $b^1$ is the detected image border for stitching and the significance of this image border is defined as $S=(NCC_{b1}-NCC_{b2})/NCC_{b1}$. The significance S is a number between 0 (no significance) and 1 (full significance).

Perform the stitching on the selected border with the corresponding displacement.

Figure 8:
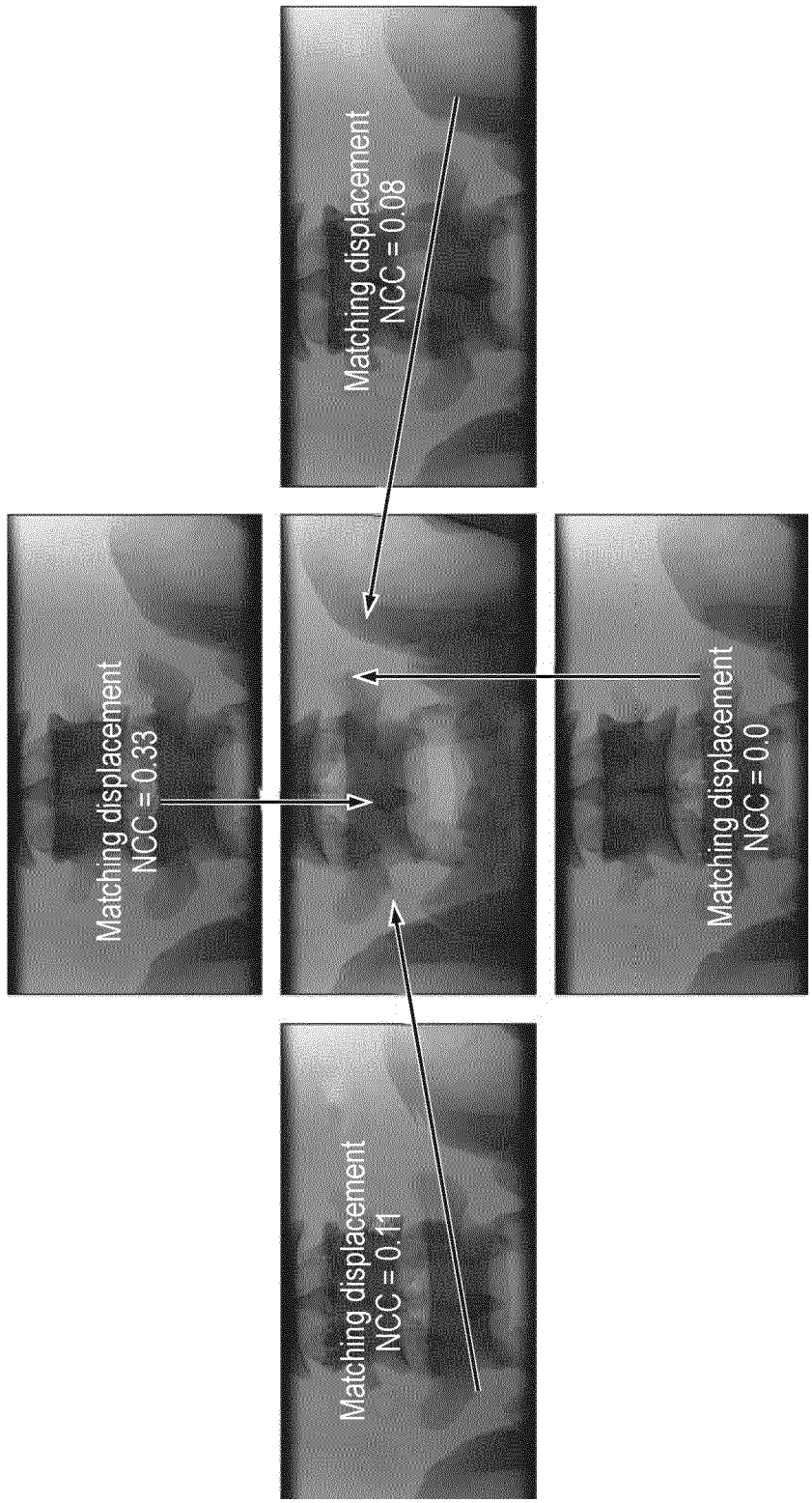
FIG. 8 shows pictorially how the scan direction and image position and overlap is automatically determined, with a first image positioned in the centre and a second image shown positioned above, to the right, below, and to the left and feature of these positions of the second image similarity values have been calculated.
Figure 9:
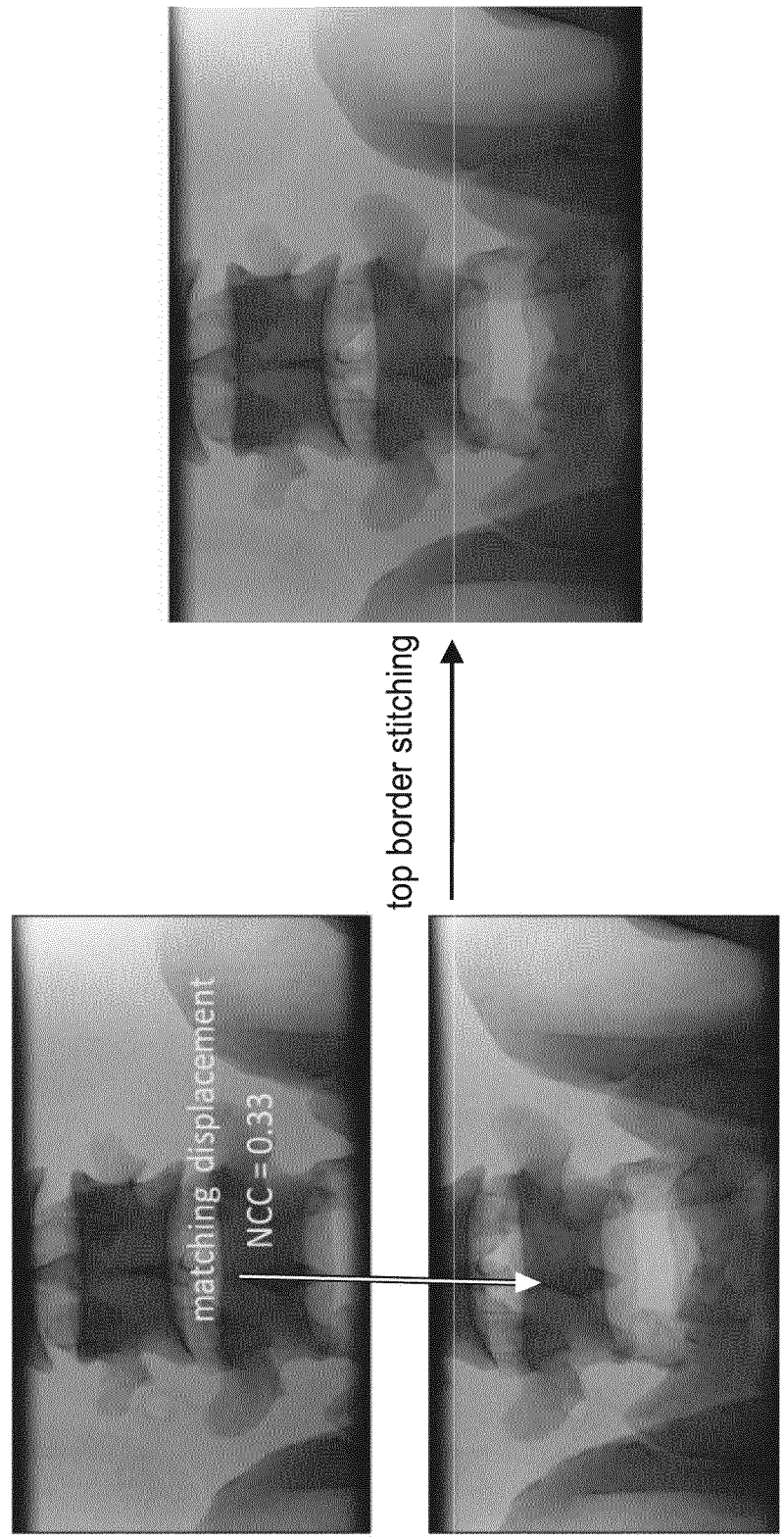
FIG. 9 shows the result of the outcome of the process shown in FIG. 8, where the second image is combined with the first image in a top border stitching process.

Image matching is defined as the determination of the partial image displacement with respect to its predecessor leading to maximal similarity between these partial images, where to obtain maximal similarity the image can be displaced in two orthogonal axes, with a major displacement in one axis and a minor displacement in the orthogonal axis. This accounts for a movement of the x-ray system generally along an axis of the x-ray system, but where the system was also moved to the side slightly. Thus, the combined image then has slightly offset edge boundaries. However, frequently the movement is directly along an axis, but it is not known which axis, positive or negative x, or positive or negative y or how far the movement was. The procedure is illustrated in FIG. 8 and FIG. 9. FIG. 8 illustrates the matching of a partial image to the 4 borders of its predecessor. The predecessor is the central image and the subsequent partial image is displayed at the top, bottom, left and right, respectively. The matching to the top border has the highest NCC value with significance S=(0.33−0.11)/0.33=0.67. FIG. 9 illustrates top border stitching of a partial image (top) to its predecessor (bottom) using the matching displacement as translation. The result is the composite image at the right.

The similarity referred to above is measured as the Normalized Cross Correlation (NCC) between image $I_1$ and the displaced image $I_2$:

$$NCC = \frac{\langle I_1 \circ D(I_2) \rangle - \langle I_1 \rangle \langle I_2 \rangle}{\sqrt{\Delta^2 I_1 \Delta^2 I_2}}$$

Here the following definitions are used:
Pixel average:

$$\langle I \rangle = \frac{1}{N} \sum_x I_{x'}$$

where x is the pixel position and N is the number of averaged pixels. For the NCC, pixel averaging is restricted to the rectangle, where both images are overlapping. This overlap rectangle depends on the displacement of the image $I_2$.

Pixel wise multiplication of two images I and J:

$$(I \circ J)_x = I_x J_x$$

Image displacement D by a translation vector t:

$$[D_t(I)]_x = I_{x+t}$$

Pixel variance:

$$\Delta^2 I = \langle I \circ I \rangle - \langle I \rangle \langle I \rangle$$

The NCC is a number between −1 and 1. With the following interpretation:
NCC=1: Fully correlated, e.g $I_2=I_1$
NCC=0: No correlation
NCC=−1: Fully anti-correlated, e.g $I_2=-I_1$ Rather than determine stitching performance in all four directions, it is possible to rotate both images and perform for example bottom border stitching similarity determination. Here, bottom is just an example, and it could be top, right or left, but what is important is that the same bottom border stitching similarity determination is carried out for the rotated images.

It was realised that scan direction detection is equivalent to partial image rotation detection, because of the following one-to-one relationship between the partial image rotation and the scan direction:

| | | |
|---|---|---|
| ROTATE_0 | ⇔ | top to bottom |
| ROTATE_90 | ⇔ | left to right |
| ROTATE_180 | ⇔ | bottom to top |
| ROTATE_270 | ⇔ | right to left |

Therefore, in case that the stitching algorithm allows only for e.g. bottom border stitching, the 3 step procedure described above can be mapped to the following equivalent 4 step procedure:

Rotate the partial image and its predecessor in discreet 90° steps and perform bottom border image matching.

Let $r^{1,2} \in \{0°, 90°, 180°, 270°\}$ the rotation corresponding to first and second highest similarity, respectively. Then, $r^1$ is the detected image rotation for stitching and the significance of this rotation is defined as $S=(NCC_{r1}-NCC_{r2})/NCG_{r1}$.

Perform bottom border stitching on partial images rotated with the selected rotation.

Rotate the composite image back with the rotation inverse to the selected partial image rotation.

Figure 10:
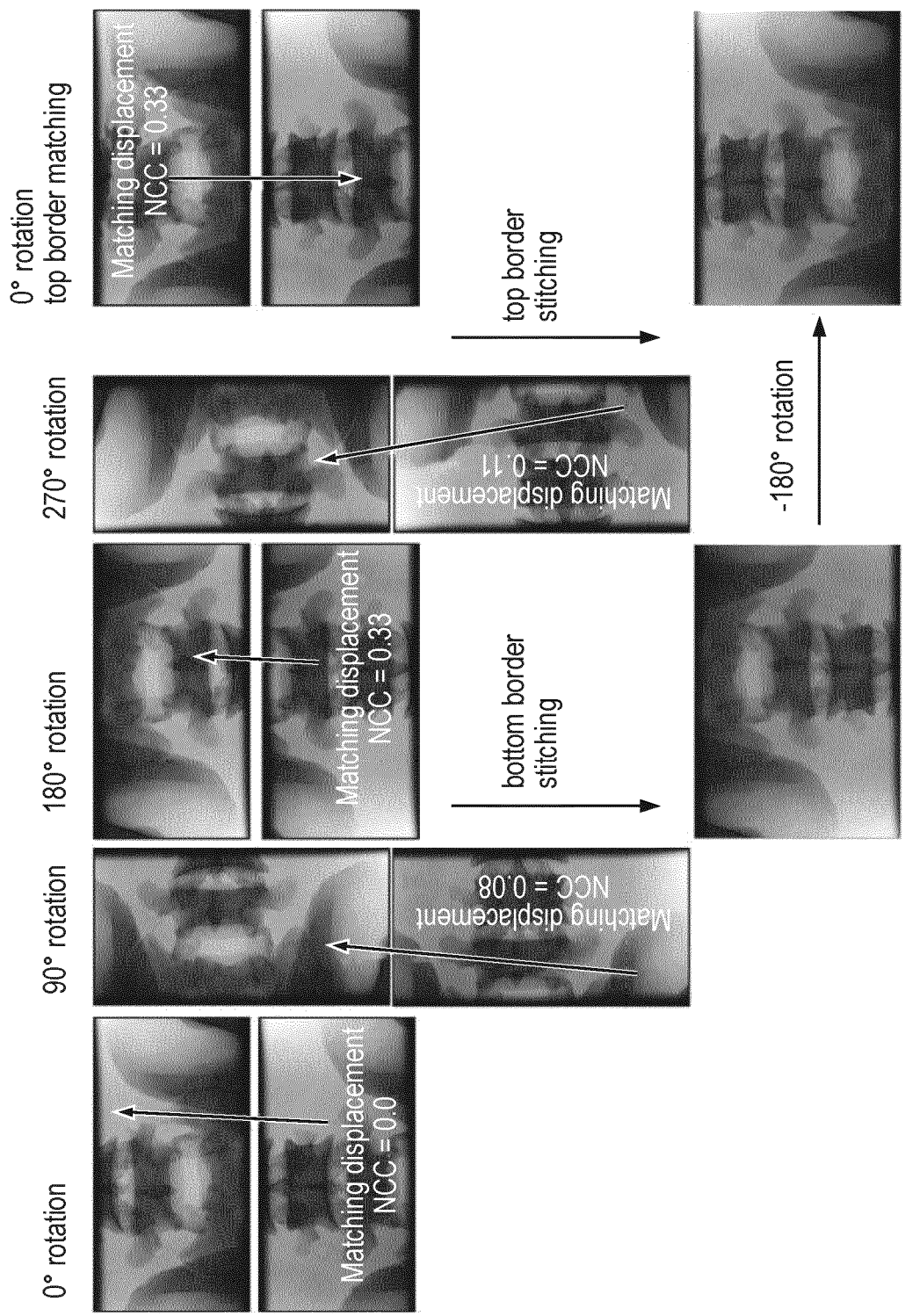
FIG. 10 illustrates a 4 step procedure of determining scan direction and image position, where rather than overlaying the image in different positions around preceding image, both images are rotated through different steps of 90° and a bottom stitching or overlay process is then applied for each image rotation enabling the same algorithm to be utilised in order to determine scan direction and image stitching requirement.

This procedure is illustrated in FIG. 10, and means that only one stitching algorithm needs to be implemented. FIG. 10 Illustrates the 4 step procedure: partial image rotation and bottom border matching, rotation selection, bottom border stitching and finally inverse rotation of composite image. This procedure is equivalent to the 3 step procedure described in conjunction with FIG. 8 and FIG. 9. The first 4 image columns illustrate bottom edge image matching for all possible 90° rotations of the partial images. The 3rd column with a 180° rotation leads to the highest NCC=0.33 with significance S=(0.33−0.11)/0.33=0.67. Therefore, this rotation is selected for image composition. The resulting composite image in the 3rd column has then been rotated inversely by −180°, which leads to the composite image in the 5th column. This image is then equivalent to the result of a top edge stitching for a scan direction bottom to top.

Now, assuming that the temporal order of the partial images is known and the scan direction does not change, for a stitching sequence consisting of a plurality of N partial images, the success rate of the automatic scan direction detection can be increased by performing a majority decision over all partial images of the stitching sequence in the following way:

Perform image matching at all image borders for all partial images out of the stitching sequence For all 4 image borders cumulate NCC values over all partial image matchings of the sequence.

Let $b^{1,2} \in$ {left, right, top, bottom} the border corresponding to first and second maximum of the 4 cumulated NCC values, respectively. Then $b^1$ is the detected image border for stitching and the significance of this image border is defined as $S=(NCC_{b1}-NCC_{b2})/NCC_{b1}$.

Image composition and scan direction determination can also be determined simultaneously. Since it is not known in advance when X-ray image acquiring will stop, the composite image should be made after adding each new acquired partial X-ray image. So each partial image N is added to the composite image according to the scan direction detected over partial images 1, . . . , N. As a consequence, if the detected scan direction for images 1, . . . , N differs from scan direction for images 1, . . . , N−1, images 1, . . . , N−1 must be re-stitched according to the new detected scan direction. To optimize performance, as soon as the significance exceeds a predefined threshold, the corresponding scan direction will be used for each next acquired image and the scan direction detection is omitted from then on (assuming the real scan direction does not change during sequence acquisition).

Figure 11:
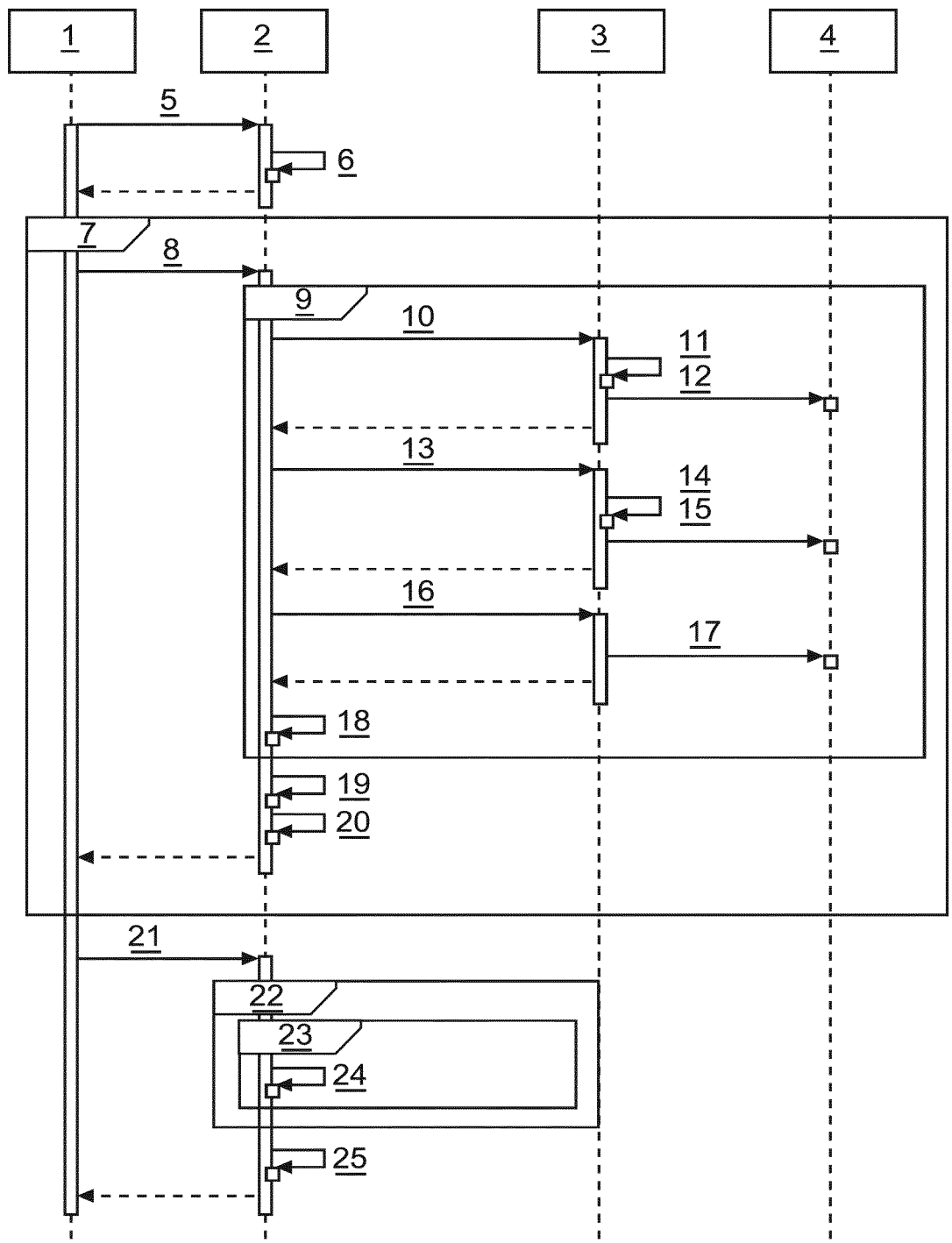
FIG. 11 shows a sequence diagram of the process of scanned direction determination and image stitching sequence determination.

FIG. 11 illustrates a sequence diagram for the detection of partial image rotation, equivalent to detection of scan direction as discussed above. In FIG. 11 the numerals refer to the following logical software units and functions:

Stitching Application: 1
RotationDetector: 2
StitchingPipeline: 3
AlignmentAnalyzer: 4
Init( ): 5
ClearSimilarities( ): 6
Loop all images: 7
Addimage(image): 8
Loop all rotations: 9
Update(previous image, rotation, isFirst): 10
Rotateimage(rotation): 11
Process(previous image, isfirst): 12
Update(image, rotation): 13
Rotateimage(rotation): 14
Process(image): 15
Displacement, similarity=getAlignmentResults( ): Pair: 16
Displacement, similarity=getAlignmentResults( ): Pair: 17
Rotationsimilarities[rotation]=setSimilarity(similarity): 18
Similarities=addRotationSimilarities(rotationSimilarities): 19
Previousimage=coptToPreviousimage(image): 20
Rotation, significance=getRotation( ): Pair: 21
Loop all rotations: 22
Loop all images: 23
cumSimilarities[rotation]=cumulate(similarities): 24
rotation, significance=significanceAnalysis(cumSimilarities): 25

Continuing with FIG. 11 for each added image out of a stitching sequence, the stitching pipeline is first initialized with the previous image as first image (update( . . . , isFirst)). In a second call, the current image is aligned to the previous image and the alignment results (displacement and similarity) are returned. The variable 'rotationSimilarities' is a 4 dimensional vector storing the similarities for the 4 rotation indices. The variable 'similarities' is a matrix, where the rows and the columns are indexed by the image number and the rotation index, respectively. The function 'cumulate' cumulates 'similarities' over all image numbers. Thus, the variable 'cumSimilarities' is a 4 dimensional vector storing the cumulated similarities for the 4 rotation indices. The function 'significanceAnalysis' determines the first and second similarity maximum NCCr1, NCCr2 and the corresponding rotations. The significance S of the detected rotation r1 with maximal similarity is then $S=(NCCr1-NCCr2)/NCCr1$.

Thus, as shown in FIG. 11 the scan direction detection can be realized by implementing the following logical software units:

Stitching Application

It represents a SW application which enables the user to perform image stitching. The stitching application has access to the StitchingPipeline and the RotationDetector.

StitchingPipeline

It encapsulates the incremental stitching functionality. It organizes the transfer of data or function calls to the dedicated stitching classes like e.g. the AlignmentAnalyzer or the ImageComposer.

RotationDetector

It encapsulates the detection of the rotation of the partial images inside a stitching sequence. The detection of the partial image rotation is equivalent to the detection of the scan direction, which means the movement direction of the detector during a stitching acquisition.

AlignmentAnalyzer

It is responsible for the alignment or matching of subsequent partial images. Image matching is defined as the determination of the displacement between subsequent partial images. The found displacement leads to maximal similarity in the overlap region of subsequent partial images. The similarity is quantified by the Normalized Cross Correlation (NCC).

ImageComposer (not Shown as Such)

It is responsible for the composition of partial images to a composite image. The process method receives a displacement vector between subsequent partial images. The displacement vector can originated either from the AlignmentAnalyzer (automatic stitching) or from the user (manual stitching).

Abbreviations

| | |
|---|---|
| NCC | Normalized Cross Correlation. A number between −1 and 1 |
| D | Image Displacement. A two dimensional translation |
| S | Significance of the detected image border for stitching. A number between 0 and 1 |

Definitions

| | |
|---|---|
| Partial Image | One image out of a stitching sequence |
| Composite Image | The result image obtained from the stitching of partial images out of a stitching sequence |
| Image matching | Determination of the displacement with maximal similarity between subsequent partial images |
| Image border | Image matching at one of the 4 image borders |

| | |
|---|---|
| matching | |
| Image border stitching | Stitching of subsequent partial images at a selected image border |

In another exemplary embodiment, a computer program or computer program element is provided that is characterized by being configured to execute the method steps of the method according to one of the preceding embodiments, on an appropriate apparatus or system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for scan direction detection and stitching sequence determination of a plurality of X-ray images, the apparatus comprising:
    a processor configured to:
    receive a first X-ray image acquired by an X-ray image acquisition system, the first image comprising image data of a patient;
    receive a second X-ray image acquired by the X-ray image acquisition system after movement of the X-ray image acquisition system with respect to the patient, the second image comprising image data of the patient;
    determine a top similarity value comprising a comparison of at least one region of image data of the patient at or adjacent to a top border in the first image with at least one equivalent sized region of image data of the patient at or adjacent to a bottom border in the second image;
    determine a right similarity value comprising a comparison of at least one region of image data of the patient at or adjacent to a right border in the first image with at least one equivalent sized region of image data of the patient at/or adjacent to a left border in the second image;
    determine a bottom similarity value comprising a comparison of a region of image data of the patient at or adjacent to a bottom border in the first image with an equivalent sized region of image data of the patient at or adjacent to a top border in the second image;
    determine a left similarity value comprising a comparison of a region of image data of the patient at or adjacent to a left border in the first image with an equivalent sized region of image data of the patient at or adjacent to a right border in the second image;
    determine a scan direction and translation distance of the X-ray image acquisition system associated with the movement of the X-ray acquisition system comprising utilization of a maximum of the top, right, bottom and left similarity values; and
    output the scan direction and translation distance.

2. The apparatus according to claim 1, wherein the processor is further configured to determine a combined image formed from the first image and the second image comprising utilization of the maximum of the top, right, bottom or left similarity values; and
    output the combined image.

3. The apparatus according to claim 1, wherein determination of the top similarity value comprises a determination of a plurality of similarity values comprising a comparison of an associated plurality of different sized regions of image data of the patient in the first image and the second image and a selection of a maximum similarity value of the plurality of similarity values as the top similarity value; wherein determination of the right similarity value comprises a determination of a plurality of similarity values comprising a comparison of an associated plurality of different sized regions of image data of the patient in the first image and the second image and a selection of a maximum similarity value of the plurality of similarity values as the right similarity value; wherein determination of the bottom similarity value comprises a determination of a plurality of similarity values comprising a comparison of an associated plurality of different sized regions of image data of the patient in the first image and the second image and a selection of a maximum similarity value of the plurality of similarity values as the bottom similarity value, and wherein determination of the left similarity value comprises a determination of a plurality of similarity values comprising a comparison of an associated plurality of different sized regions of image data of the patient in the first image and the second image and a selection of a maximum similarity value of the plurality of similarity values as the left similarity value.

4. The apparatus according to claim 3, wherein the comparison of each region of image data of the patient at/or adjacent to the right border in the first image with the equivalent sized region of image data of the patient at or adjacent to the left border in the second image comprises utilization of a right normalized cross correlation algorithm; wherein the comparison of each region of image data of the patient at or adjacent to the bottom border in the first image with the equivalent sized region of image data of the patient at or adjacent to the top border in the second image comprises utilization of the top normalized cross correlation algorithm or a bottom normalized cross correlation algorithm; and wherein the comparison of each region of image data of the patient at or adjacent to the left border in the first image with the equivalent sized region of image data of the patient at or adjacent to the right border in the second image comprises utilization of the right normalized cross correlation algorithm or a left normalized cross correlation algorithm.

5. The apparatus according to claim 4, wherein the comparison of each region of image data of the patient at and/or adjacent to the right border in the first image with the equivalent sized region of image data of the patient at and/or adjacent to the left border in the second image comprises a counterclockwise 90 degree rotation of the first image and a counterclockwise 90 degree rotation of the second image prior to the utilization of the top normalized cross correlation algorithm;
wherein the comparison of each region of image data of the patient at and/or adjacent to the bottom border in the first image with the equivalent sized region of image data of the patient at and/or adjacent to the top border in the second image comprises a 180 degree rotation of the first image and a 180 degree rotation of the second image prior to the utilization of the top normalized cross correlation algorithm; and wherein the comparison of each region of image data of the patient at and/or adjacent to the left border in the first image with the equivalent sized region of image data of the patient at and/or adjacent to the right border in the second image comprises a clockwise 90 degree rotation of the first image and a clockwise 90 degree rotation f the second image prior to the utilization of the top normalized cross correlation algorithm.

6. The apparatus according to claim 3, wherein the comparison of each region of image data of the patient at and/or adjacent to the right border in the first image with the equivalent sized region of image data of the patient at or adjacent to the left border in the second image comprises utilization of the top normalized cross correlation algorithm; wherein the comparison of each region of image data of the patient at or adjacent to the bottom border in the first image with the equivalent sized region of image data of the patient at or adjacent to the top border in the second image comprises utilization of the top normalized cross correlation algorithm; and wherein the comparison of each region of image data of the patient at and/or adjacent to the left border in the first image with the equivalent sized region of image data of the patient at and/or adjacent to the right border in the second image comprises utilization of the top normalized cross correlation algorithm.

7. The apparatus according to claim 1, wherein the comparison of each region of image data of the patient at or adjacent to the top border in the first image with the equivalent sized region of image data of the patient at or adjacent to the bottom border in the second image comprises utilization of a top normalized cross correlation algorithm.

8. A system for scan direction detection and stitching sequence determination of a plurality of X-ray images, the system comprising:
an image acquisition system; and
an apparatus according to claim 1.

9. An apparatus for scan direction detection and stitching sequence determination of a plurality of X-ray images, the apparatus comprising:
a processor configured to:
receive a plurality Number of X-ray images acquired by an X-ray image acquisition system, wherein after each of the first Number-1 images, the X-ray image acquisition system moves with respect to a patient each of the Number X-ray images comprising image data of the patient;
select an X-ray image of the Number X-ray images;
determine a top similarity value comprising a determination of a plurality of similarity values comprising a comparison of at least one region of image data of the patient at or adjacent to a top border in the selected image with at least one equivalent sized region of image data of the patient at or adjacent to a bottom border in each of the other Number-1 images and select a maximum similarity value of the plurality of similarity values as the top similarity value;
determine a right similarity value comprising a determination of a plurality of similarity values comprising a comparison of a region of image data of the patient at or adjacent to a right border in the selected image with an equivalent sized region of image data of the patient at or adjacent to a left border in each of the other Number-1 images and select a maximum similarity value of the plurality of similarity values as the right similarity value;
determine a bottom similarity value comprising a determination of a plurality of similarity values comprising a comparison of a region of image data of the patient at or adjacent to a bottom border in the selected image with an equivalent sized region of image data of the patient at or adjacent to a top border in other Number-1 images and select a maximum similarity value of the plurality of similarity values as the bottom similarity value;
determine a left similarity value comprising a determination of a plurality of similarity values comprising a comparison of a region of image data of the patient at or adjacent to a left border in the selected image with an equivalent sized region of image data of the patient at or adjacent to a right border in each of the other Number-1 images and select a maximum similarity value of the plurality of similarity values as the left similarity value;

determine a scan direction and translation distance of the X-ray image acquisition system associated with the movement of the X-ray acquisition system comprising utilization of a maximum of the top, right, bottom and left similarity values; and output the scan direction and translation distance.

10. The apparatus according to claim 9, wherein the processor is further configured to determine a combined image formed from the first image and the second image comprising utilization of the maximum of the top, right, bottom and left similarity values; and output the combined image.

11. The apparatus according to claim 10, wherein the comparison of each region of image data of the patient at or adjacent to the right border in the selected image with the equivalent sized region of image data of the patient at and/or adjacent to the left border in each of the other Number-1 images comprises utilization of a right normalized cross correlation algorithm; wherein the comparison of each region of image data of the patient at and/or adjacent to the bottom border in the selected image with the equivalent sized region of image data of the patient at and/or adjacent to the top border in each of the other Number-1 images comprises utilization of a bottom normalized cross correlation algorithm;

and wherein the comparison of each region of image data of the patient at or adjacent to the left border in the selected image with the equivalent sized region of image data of the patient at or adjacent to the right border in each of the other Number-1 images comprises utilization of a left normalized cross correlation algorithm.

12. The apparatus according to claim 9, wherein for each pair of the selected image and an image of the other Number-1 determination of the top similarity value comprises a determination of a plurality of similarity values comprising a comparison of an associated plurality of different sized regions of image data of the patient in the selected image and the image of the other Number-1 images and a selection of a maximum similarity value of the plurality of similarity values as the top similarity value;

wherein for each pair of the selected image and an image of the other Number-1 images determination of the right similarity value comprises a determination of a plurality of similarity values comprising a comparison of an associated plurality of different sized regions of image data of the patient in the selected image and the image of the other Number-1 images and a selection of a maximum similarity value of the plurality of similarity values as the top similarity value; wherein for each pair of the selected image and an image of the other Number-1 images determination of the bottom similarity value comprises a determination of a plurality of similarity values comprising a comparison of an associated plurality of different sized regions of image data of the patient in the selected image and the image of the other Number-1 images and a selection of a maximum similarity value of the plurality of similarity values as the bottom similarity value; and wherein for each pair of the selected image and an image of the other Number-1 images determination of the left similarity value comprises a determination of a plurality of similarity values comprising a comparison of an associated plurality of different sized regions of image data of the patient in the selected image and the image of the other Number-1 images and a selection of a maximum similarity value of the plurality of similarity values as the left similarity value.

13. The apparatus according to claim 9, wherein the comparison of each region of image data of the patient at or adjacent to the top border in the selected image with the equivalent sized region of image data of the patient at and/or adjacent to the bottom border in each of the other Number-1 images comprises utilization of a top normalized cross correlation algorithm.

14. The apparatus according to claim 13, wherein the comparison of each region of image data of the patient at and/or adjacent to the right border in the selected image with the equivalent sized region of image data of the patient at or adjacent to the left border in each of the other Number-1 images comprises utilization of the top normalized cross correlation algorithm; wherein the comparison of each region of image data of the patient at and/or adjacent to the bottom border in the selected image with the equivalent sized region of image data of the patient at and/or adjacent to the top border in each of the other Number-1 images comprises utilization of the top normalized cross correlation algorithm; and wherein the comparison of each region of image data of the patient at or adjacent to the left border in the selected image with the equivalent sized region of image data of the patient at or adjacent to the right border in each of the other Number-1 images comprises utilization of the top normalized cross correlation algorithm.

15. The apparatus according to claim 14, wherein the comparison of each region of image data of the patient at and/or adjacent to the right border in the selected image with the equivalent sized region of image data of the patient at or adjacent to the left border in the each of the other Number-1 images comprises a counterclockwise 90degree rotation of the selected image and a counterclockwise 90 degree rotation of each of the other Number-1 images prior to the utilization of the top normalized cross correlation algorithm; wherein the comparison of each region of image data of the patient at or adjacent to the bottom border in the selected image with the equivalent sized region of image data of the patient at or adjacent to the top border in the each of the other Number-1 images comprises a 180 degree rotation of the selected image and a 180 degree rotation of each of the other Number-1 images prior to the utilization of the top normalized cross correlation algorithm; and wherein the comparison of each region of image data of the patient at and/or adjacent to the left border in the selected image with the equivalent sized region of image data of the patient at and/or adjacent to the right border in the each of the other Number-1 images comprises a clockwise 90 degree rotation of the selected image and a clockwise 90 degree rotation of each of the other Number-1 images prior to the utilization of the top normalized cross correlation algorithm.

16. A method for scan direction detection and stitching sequence determination of a plurality of X-ray images, the method comprising:

providing a first X-ray image acquired by an X-ray image acquisition system, wherein the first image comprises image data of a patient;

providing a second X-ray image acquired by the X-ray image acquisition system after it has moved with respect to the patient, wherein the second image comprises image data of the patient;

determining a top similarity value comprising comparing at least one region of image data of the patient at and/or adjacent to a top border in the first image with at least one equivalent sized region of image data of the patient at or adjacent to a bottom border in the second image;

determining a right similarity value comprising comparison at least one region of image data of the patient at or adjacent to a right border in the first image with at least one equivalent sized region of image data of the patient at or adjacent to a left border in the second image;

determining a bottom similarity value comprising comparing a region of image data of the patient at or adjacent to a bottom border in the first image with an equivalent sized region of image data of the patient at or adjacent to a top border in the second image;

determining a left similarity value comprising comparison a region of image data of the patient at or adjacent to a left border in the first image with an equivalent sized region of image data of the patient at or adjacent to a right border in the second image;

determining a scan direction and translation distance of the X-ray image acquisition system associated with the movement of the X-ray acquisition system comprising utilizing a maximum of the top, right, bottom and left similarity values or determining a combined image formed from the first image and the second image comprising utilizing the maximum of the top, right, bottom and left similarity values; and outputting the scan direction and at least one of translation distance and the combined image.

17. The method according to claim 16, further comprising determining a combined image formed from the first image and the second image comprising utilizing the maximum of the top, right, bottom and left similarity values and outputting the combined image.

* * * * *